United States Patent
Franke et al.

(10) Patent No.: US 10,218,167 B2
(45) Date of Patent: Feb. 26, 2019

(54) CIRCUIT BREAKER

(71) Applicant: Siemens Aktiengesellschaft, Munich (DE)

(72) Inventors: Henry Franke, Berlin (DE); Wolfgang Fruth, Amberg (DE); Stefan Haebel, Oberasbach (DE); Rainer Huentemeier, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 338 days.

(21) Appl. No.: 15/140,598

(22) Filed: Apr. 28, 2016

(65) Prior Publication Data

US 2016/0322805 A1    Nov. 3, 2016

(30) Foreign Application Priority Data

Apr. 30, 2015 (DE) .......... 10 2015 208 059
Feb. 3, 2016 (DE) .......... 10 2016 201 651

(51) Int. Cl.
*H02H 3/093* (2006.01)
*H02H 3/00* (2006.01)
*H02H 7/30* (2006.01)

(52) U.S. Cl.
CPC .......... *H02H 3/0935* (2013.01); *H02H 3/006* (2013.01); *H02H 7/30* (2013.01)

(58) Field of Classification Search
CPC ......... H02H 3/0935; H02H 3/006; H02H 7/30
See application file for complete search history.

(56) References Cited

U.S. PATENT DOCUMENTS 4,351,012 A * 9/1982 Elms .................. H02H 3/006
                                                    361/96
4,694,373 A    9/1987 Demeyer
(Continued)

FOREIGN PATENT DOCUMENTS

DE        10032655 A1    1/2002
DE    102014224173 A1    6/2016
(Continued)

OTHER PUBLICATIONS

Chinese Office Action and English translation thereof dated Oct. 19, 2017.
(Continued)

*Primary Examiner* — Scott Bauer
(74) *Attorney, Agent, or Firm* — Harness, Dickey & Pierce, P.L.C.

(57) ABSTRACT

A circuit breaker includes a tripping unit for interrupting an electrical circuit, and at least one current sensor for determining the electrical current flowing through the circuit breaker, connected to a control unit and configured such that the determined current is compared with current/period limit values. If a current/period limit value is exceeded, the tripping unit interrupts the electrical circuit. The current/period limit values include an adjustable first current limit value, present for a first period for an interruption; an adjustable second period, during which a second current limit value must be present to effect an interruption; and a range between the first current limit value and the second current limit value, the period decreasing with increasing current limit values in order to effect an interruption. The second current limit value can be adjusted at the circuit breaker.

29 Claims, 3 Drawing Sheets

(56) References Cited

U.S. PATENT DOCUMENTS

| | | | | |
|---|---|---|---|---|
| 4,827,369 | A | * | 5/1989 | Saletta .................... H02H 3/04 |
| | | | | 361/93.2 |
| 6,292,717 | B1 | * | 9/2001 | Alexander ......... G01R 19/2513 |
| | | | | 340/6.1 |
| 2003/0156374 | A1 | | 8/2003 | Edwards et al. |
| 2005/0047045 | A1 | * | 3/2005 | Puskar .................. H02H 3/006 |
| | | | | 361/115 |
| 2009/0195337 | A1 | | 8/2009 | Carlino et al. |
| 2009/0257156 | A1 | * | 10/2009 | Vicente ............... H02H 3/0935 |
| | | | | 361/42 |
| 2009/0257158 | A1 | * | 10/2009 | Vicente .................. H02H 7/30 |
| | | | | 361/42 |

FOREIGN PATENT DOCUMENTS

| | | |
|---|---|---|
| EP | 2423938 B1 | 4/2015 |
| WO | 2016/083 486 A1 | 6/2016 |

OTHER PUBLICATIONS

Bryner, P.: "Niederspannungs-Leistungsschalter (NS-LS)." In: Elektrotechnik 9/14; pp. 2-4; electro suisse; 2014.
German Office Action dated Jul. 11, 2016.
Office Action for German Patent Application No. 10 2016 201 651.2 dated Dec. 12, 2018.

* cited by examiner

CIRCUIT BREAKER

PRIORITY STATEMENT

The present application hereby claims priority under 35 U.S.C. § 119 to German patent application numbers DE 102015208059.5 filed Apr. 30, 2015 and DE 102016201651.2 filed Feb. 3, 2016, the entire contents of each of which are hereby incorporated herein by reference.

FIELD

At least one embodiment of the invention generally relates to a circuit breaker.

At least one embodiment of the invention may further relate to circuit breakers such as molded case circuit breakers, air circuit breakers or circuit breakers of this kind.

BACKGROUND

Circuit breakers are special switches or protective or/and switching devices which are designed in such a manner that they can switch load currents, high overload and short-circuit currents on and off and can safely disconnect them under many fault conditions, for example a ground fault, phase opposition, an overload and a short circuit, in an electrical power supply system, for example a low-voltage network. Such switching devices are used in electrical installations as feed switches, distribution switches, coupling switches and outgoer switches. Such switches are also used when switching and protecting motors, capacitors, generators, transformers, busbars and cables.

Circuit breakers can be used, in particular, in low-voltage networks, that is to say networks with voltages or rated voltages of up to 1000 volts AC or 1500 volts DC. These circuit breakers have sensor units, such as current sensors, which measure the electrical current flowing through switches.

Circuit breakers are used for current intensities or a rated current range of 16 to 6300 amperes, in particular in the low-voltage range. They are used as a molded case circuit breaker, for example, in particular in the range of 16 to 1600 amperes, more specifically in the range of 63 to 1600 amperes, and are used as an air circuit breaker, for example, in the range of 630 to 6300 amperes.

Circuit breakers usually have a tripping unit for interrupting the electrical circuit, which tripping unit is implemented, for example, using contacts which open and close the electrical circuit. A circuit breaker also has a control unit which may be implemented in a central or decentralized manner. If current limit values or/and current/period limit values, which are defined by a characteristic curve for example, are exceeded, the circuit breaker interrupts the electrical circuit.

Circuit breakers are designed for different currents. A first current characteristic value of the circuit breaker is the rated current In. This is generally the current with which the circuit breaker can be permanently loaded. This rated current depends on the device. One or more current limit values which are less than, equal to or greater than the rated current In are generally defined or adjusted.

A first adjustable current limit value Isd of the circuit breaker, which must be present for a first period t1 for an interruption, is the current limit value for the so-called interruption with a short time delay or current-dependent interruption with a short time delay. That is to say, this first current limit value Isd defines the level of the current from which an interruption with a short time delay begins. In this case, the current must be present for the first period t1 before an interruption is affected.

An adjustable second period tsd of the circuit breaker, during which a second current limit value Iref must be present for this second period, defines the minimum period for the interruption with a short time delay or current-dependent interruption with a short time delay before which tripping/interruption is effected for the maximum second current limit value Iref which can have a short time delay. If the current increases further, the electrical circuit is generally interrupted without a delay, that is to say an interruption is effected with the minimum or adjusted short or shortest tripping time of the circuit breaker.

The range between the first current limit value Isd during the first period t1, that is to say the start of the method of operation or characteristic curve with a short time delay, and the second current limit value Iref during the adjustable second period tsd, that is to say the end of the method of operation with a short time delay, is defined by a characteristic curve in which the period decreases with increasing current in order to effect an interruption.

Circuit breakers are used to distribute electrical energy. If a fault occurs in the energy distribution installation, the circuit breaker arranged immediately upstream of the fault is supposed to detect the fault or/and short-circuit current, trip the circuit and disconnect the current. A plurality of parameters, current set values, delays and characteristic curve forms are required for this so-called selective tripping.

The devices can be selectively tripped, for example, using current or time staggering. In this case, the characteristic curves of the devices must not overlap. FIG. 1a illustrates an example of a logarithmically represented current/period limit value characteristic curve. FIG. 1a shows a graph, where the current I is plotted on the X axis and the time t is plotted on the Y axis. FIG. 1b shows a series circuit comprising a first circuit breaker O1 which is arranged on the current-source side or feed side and is followed by a first busbar SCH1 for distributing the electrical energy. A second circuit breaker O2 is arranged on this first busbar SCH1 and is followed by a second busbar SCH2 for distributing the electrical energy further. A third circuit breaker O3 is arranged on this second busbar and one or more electrical loads are arranged at the third circuit breaker, for example. Figure 1a shows the characteristic curves of the circuit breakers O1, O2, O3, where these characteristic curves do not overlap.

In addition to the staggering of the characteristic curves of circuit breakers, as illustrated in FIG. 1, FIG. 2 shows an illustration according to FIG. 1 with the difference that a fuse F1, such as a low-voltage high-rupture-capacity fuse, is connected downstream of the first circuit breaker O1. Since the characteristic curves of circuit breakers and fuses differ, an accordingly large distance between the characteristic curves should be selected in order to achieve selectivity since the characteristic curve form of fuses virtually cannot be adapted and the characteristic curve form of circuit breakers can be adapted only to a limited extent.

The current/period limit value characteristic curve of the circuit breaker O1 according to FIG. 2a has a reference point RP at which the current/period limit value characteristic curve changes to a fixed delay. The position of the reference point RP depends on the device.

As a result, a selective or non-selective behavior can result on the basis of the circuit breakers used or the upstream or downstream fuses.

SUMMARY

At least one embodiment is directed to a circuit breaker.

Advantageous configurations of embodiments of the invention are stated in the claims.

In at least one embodiment, a circuit breaker for an electrical circuit, comprises:

a tripping unit for interrupting the electrical circuit, and at least one current sensor for determining the electrical current (I) flowing through the circuit breaker, the two components being connected to a control unit and configured in such a manner that the determined current (I) is compared with current/period limit values and, if a current/period limit value is exceeded, the tripping unit interrupts the electrical circuit, the current/period characteristic curve comprising:

an adjustable first current limit value (Isd) which must be present for a first period (t1) for an interruption, an adjustable second period (tsd) during which a second current limit value (Iref) must be present for this second period (tsd) in order to effect an interruption, and a range between the first current limit value (Isd) during the first period (t1) and the second current limit value (Iref) during the second period (tsd), the period (t) decreasing with increasing current limit values in order to effect an interruption.

Alternatively, in another embodiment, the control unit can be configured in such a manner that the determined current (I) is compared with set values of a current/time characteristic curve and, if a current limit value is exceeded, the tripping unit interrupts the electrical circuit after the time determined by the characteristic curve, the current/time characteristic curve comprising the following limit values:

an adjustable first current limit value (Isd) which must be present for a first period (t1) for an interruption, an adjustable second period (tsd) during which a second current limit value (Iref) must be present for this second period (tsd) in order to effect an interruption, a range between the first current limit value (Isd) during the first period (t1) and the second current limit value (Iref) during the second period (tsd), the period (t) decreasing with increasing current limit values in order to effect an interruption.

BRIEF DESCRIPTION OF THE DRAWINGS

The described properties, features and advantages of this invention and the manner in which they are achieved become clearer and more clearly comprehensible in connection with the following description of the example embodiments which are explained in more detail in connection with the drawings, in which.

DETAILED DESCRIPTION OF THE EXAMPLE EMBODIMENTS

Figure 1A:
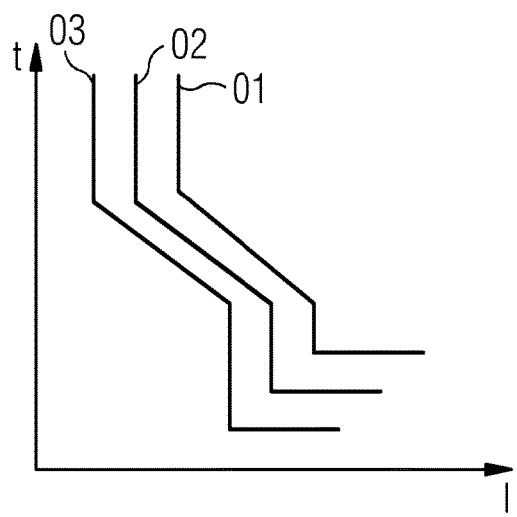
FIG. 1a shows three staggered current/period limit value characteristic curves.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In at least one embodiment, a circuit breaker for an electrical circuit, comprises:
  a tripping unit for interrupting the electrical circuit, and
  at least one current sensor for determining the electrical current (I) flowing through the circuit breaker, the two components being connected to a control unit and configured in such a manner that the determined current (I) is compared with current/period limit values and, if a current/period limit value is exceeded, the tripping unit interrupts the electrical circuit, the current/period characteristic curve comprising:
    an adjustable first current limit value (Isd) which must be present for a first period (t1) for an interruption,
    an adjustable second period (tsd) during which a second current limit value (Iref) must be present for this second period (tsd) in order to effect an interruption, and
    a range between the first current limit value (Isd) during the first period (t1) and the second current limit value (Iref) during the second period (tsd), the period (t) decreasing with increasing current limit values in order to effect an interruption.

Alternatively, in another embodiment, the control unit can be configured in such a manner that the determined current (I) is compared with set values of a current/time characteristic curve and, if a current limit value is exceeded, the tripping unit interrupts the electrical circuit after the time determined by the characteristic curve, the current/time characteristic curve comprising the following limit values:
  an adjustable first current limit value (Isd) which must be present for a first period (t1) for an interruption, an adjustable second period (tsd) during which a second current limit value (Iref) must be present for this second period (tsd) in order to effect an interruption, a range between the first current limit value (Isd) during the first period (t1) and the second current limit value (Iref) during the second period (tsd), the period (t) decreasing with increasing current limit values in order to effect an interruption.

At least one embodiment of the invention provides for the second current limit value Iref to be able to be adjusted at the circuit breaker. This advantageously makes it possible to achieve a greater adjustment range of the current/period limit value characteristic curve, in particular for protection with a short time delay. This enables closer staggering of circuit breakers or fuses/protective devices.

In one advantageous embodiment of the invention, the range between the first current limit value Isd during the first period t1 and the second current limit value Iref during the second period tsd has a current/period limit value characteristic curve which is characterized by part of an inverse quadratic function. This has the particular advantage that a more strongly increasing (quadratic) shortening of the interruption time is achieved with increasing current in order to avoid overloading the circuit breaker.

In one advantageous embodiment of the invention, the second current limit value Iref can be adjusted as a multiple of the rated current In. This has the particular advantage that there is particularly simple, relative adjustability of the second current limit value.

In one advantageous embodiment of the invention, the circuit breaker has an adjustable third current limit value Ir which is less than or equal to the rated current In and, when exceeded, causes an interruption with a long time delay, the period decreasing with increasing current limit values, to be affected by way of a current/period limit value characteristic curve which is characterized by an inverse power function with the supporting point:

a first multiple nxIr of the third current limit value Ir during a third period tr.

This has the particular advantage that, in addition to the adjustability with a short time delay, there is also adjustability of the characteristic curve of a circuit breaker with a long time delay.

In one advantageous embodiment of the invention, the inverse power function is a fourth-power inverse power function. This has the particular advantage that a very much more greatly increasing shortening of the interruption time is achieved with increasing current in order to avoid overloading the circuit breaker by the long time delay.

In one advantageous embodiment of the invention, the first multiple of the third current limit value Ir is 6 times the third current limit value Ir. This has the particular advantage that a point is defined for the characteristic curve of the protection with a long time delay.

In one advantageous embodiment of the invention, the second current limit value Iref can be adjusted as a multiple of the third current limit value Ir. This has the particular advantage that there is a further simple adjustment possibility, the protection with a short time delay being able to be adjusted on the basis of the protection with a long time delay.

In one advantageous embodiment of the invention, the second current limit value Iref can be adjusted in the range of 6 times to 12 times the third current limit value Ir. This has the particular advantage that there is simple adjustability in the adjustment range which can usually be expected.

In one advantageous embodiment of the invention, the second current limit value Iref can be adjusted as a multiple of the first current limit value Isd. This has the particular advantage that there is a further simple adjustment possibility, the end of the protection with a short time delay being able to be adjusted relative to the start of the protection with a short time delay.

In one advantageous embodiment of the invention, the first current limit value Isd can be adjusted as a multiple of the rated current In or of the third current limit value Ir. This has the particular advantage that a simple relative adjustment possibility is possible for the first current limit value on the basis of the rated current of the circuit breaker or on the basis of the start of the protection with a long time delay.

In one advantageous embodiment of the invention, a fourth current limit value (Ii) is provided and, when exceeded, causes the circuit breaker to interrupt the electrical circuit without a delay. This has the particular advantage that an interruption without a delay is effected for currents above the range of the protection with a short time delay.

In one advantageous embodiment of the invention, the circuit breaker is an air circuit breaker. An embodiment of the invention can display its particularly advantageous effect here and can extend the field of application of an air circuit breaker.

In one advantageous embodiment of the invention, the circuit breaker is a molded case circuit breaker. This has the particular advantage that an embodiment of the invention also extends the field of application of a molded case circuit breaker here.

All embodiments of the invention improve a circuit breaker, in particular the protective function of a circuit breaker, and improve the protective functions of all protective devices involved, which protective functions are matched to one another.

Figure 1B:
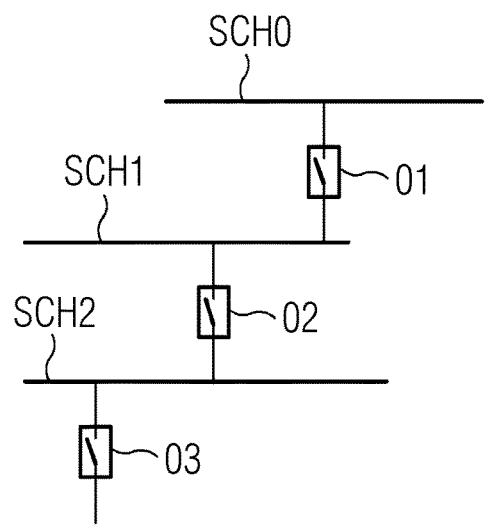
FIG. 1b shows three circuit breakers arranged in series.

FIG. 1a shows three staggered current/period limit value characteristic curves of circuit breakers arranged in series according to FIG. 1b.

Figure 2A:
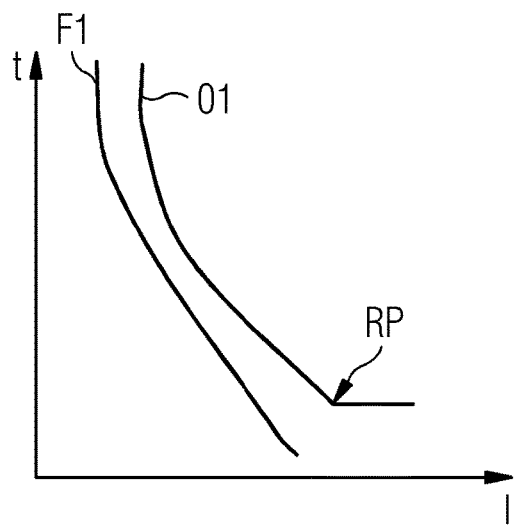
FIG. 2a shows two staggered current/period limit value characteristic curves.
Figure 2B:
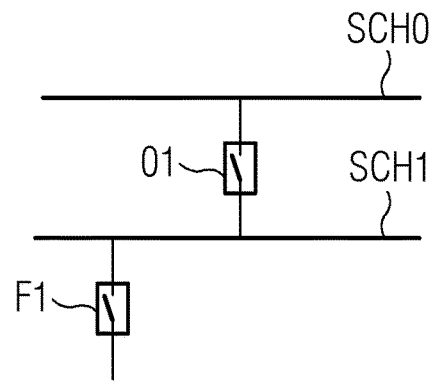
FIG. 2b shows a series circuit comprising a circuit breaker and a fuse.

FIG. 2a shows two staggered current/period limit value characteristic curves of a circuit breaker, on the one hand, and of a fuse, on the other hand, which are both arranged in series according to FIG. 2b.

Figure 3:
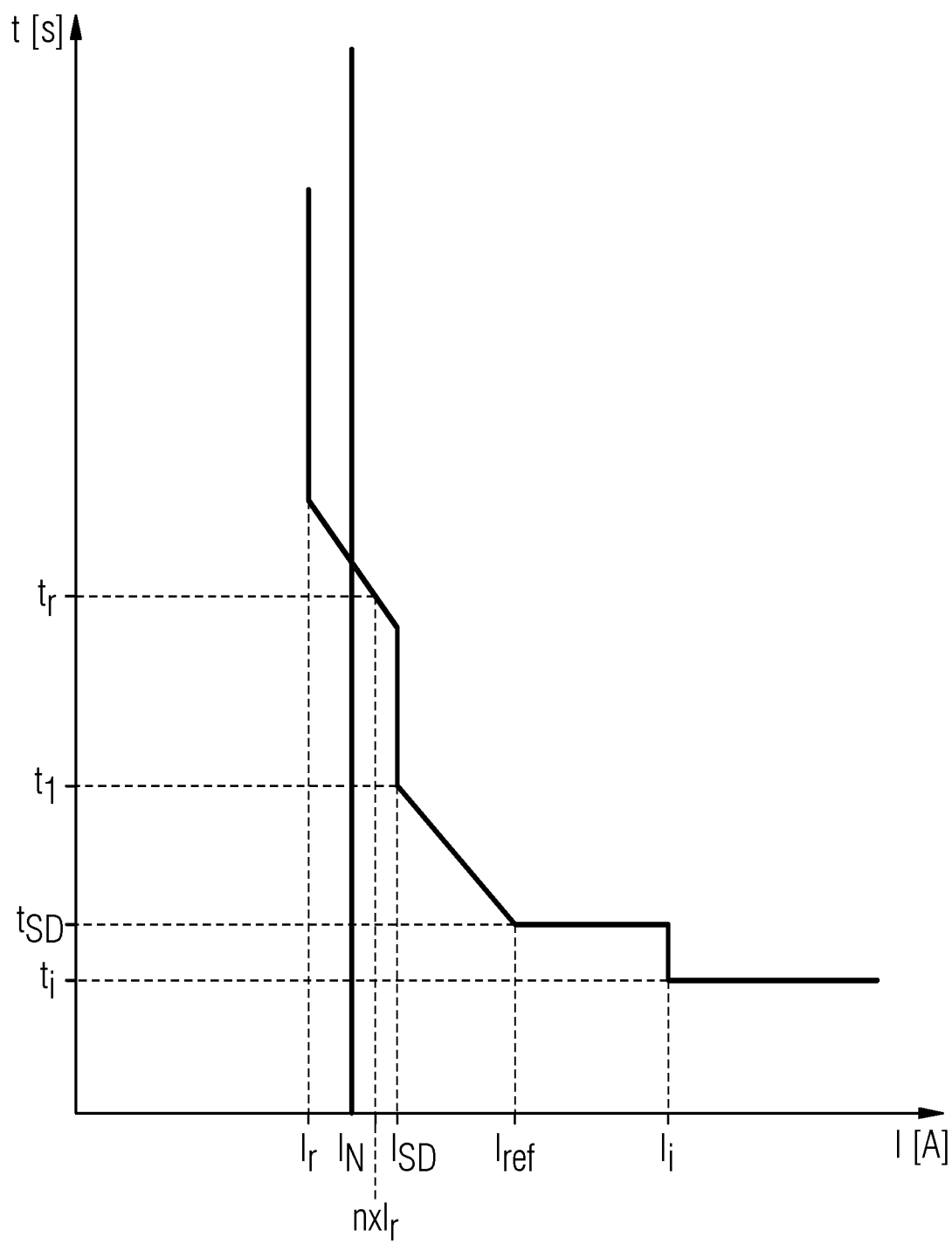
FIG. 3 shows a graph containing a characteristic curve of a circuit breaker for explaining characteristic points of the current/period limit values.

FIG. 3 shows a graph containing a characteristic curve of a circuit breaker. The electrical current I (in amperes) is plotted on the X axis. The time (in seconds) is plotted on the Y axis. The representation of the current and of the time in the graph is logarithmic.

The device-dependent rated current In of the circuit breaker is depicted as a vertical straight line. The characteristic curve of the circuit breaker begins with an adjustable third current limit value Ir which is usually part of the rated current In and can generally be adjusted in the range of 0.4 to 1 times the rated current In. This constitutes the tripping current for tripping with a long time delay. If the determined electrical current I is less than the third current limit value Ir, the electrical circuit is not interrupted. If the electrical current I is equal to or greater than the third current limit value Ir, this current must be present according to the characteristic curve for the time resulting therefrom before an interruption is effected. That is to say, the third current limit value Ir is followed, with increasing current I, by a section of decreasing time t, which section is indicated by a first inclined straight line. This section can follow, for example, an inverse power function, for example a fourth-power inverse power function ($x^{-4}$). As a result of the double-logarithmic representation, the function is represented as an inclined straight line. This inverse power function is indicated by a supporting point, this supporting point being defined by a multiple nxIr of the third current limit value Ir during a third period tr.

With increasing current I, an adjustable first current limit value Isd is reached and is used to define the start of the protection with a short time delay. This first current limit value Isd is followed, with increasing current I, by a region of decreasing time t which is indicated by a second inclined straight line. This region can follow, for example, a further inverse power function, for example an inverse quadratic function ($x^{-2}$). As a result of the double-logarithmic representation, the function is represented as a second inclined straight line. This further inverse power function is limited, on the one hand, by the adjustable first current limit value Isd and, on the other hand, by an adjustable second period tsd which is assigned a second current limit value Iref. This second current limit value must be present for this second period tsd in order to effect an interruption. The second current limit value Iref is usually permanently set or predefined inside the device, for example permanently programmed to 12 times the rated current. This means that the first period t1 results on the basis of the adjustment of the first current limit value Isd, the second period tsd and the further power function, the inverse quadratic power function in the example.

If the current I is greater than the second current limit value Iref, disconnection is carried out after the second period tsd. A fourth current limit value Ii may follow the characteristic curve, at which the electrical circuit is interrupted for a time ti which is usually dependent on the device. That is to say, the electrical circuit is usually interrupted without a delay.

Figure 4A:
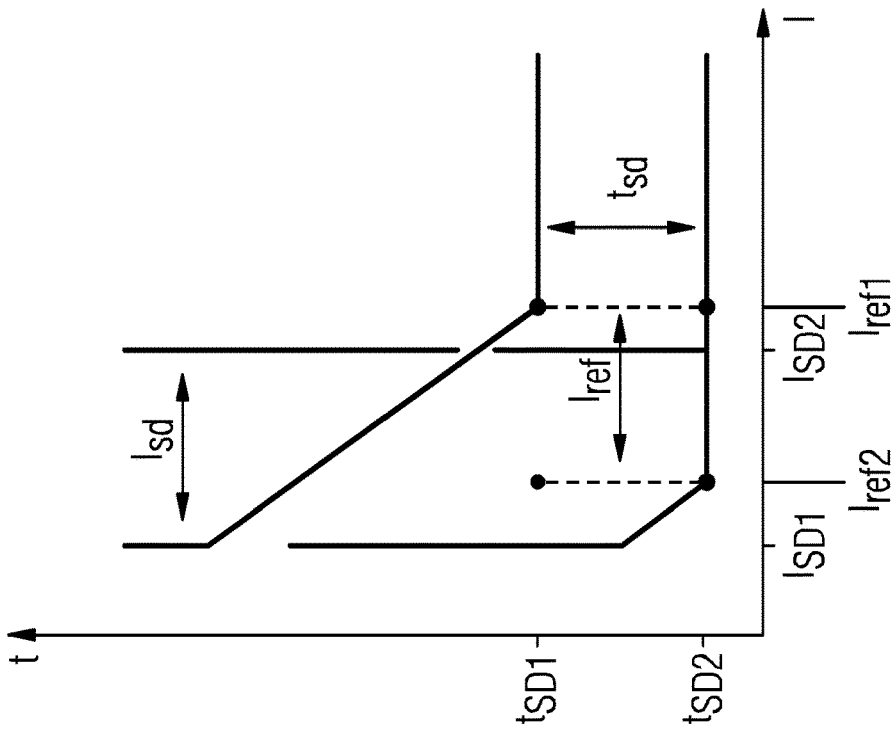
FIG. 4a shows first characteristic curve adjustment ranges.

FIG. 4a shows, in the graph, the adjustment ranges for the protection with a short time delay, which ranges can be achieved by way of these current/period limit values. It is possible to adjust the first current limit value Isd in the range of Isd1 to Isd2, for example. It is possible to adjust the second period in the range of tsd1 to tsd2. The second current limit value Iref is permanently set. The region which has been filled out is the adjustment range.

Figure 4B:
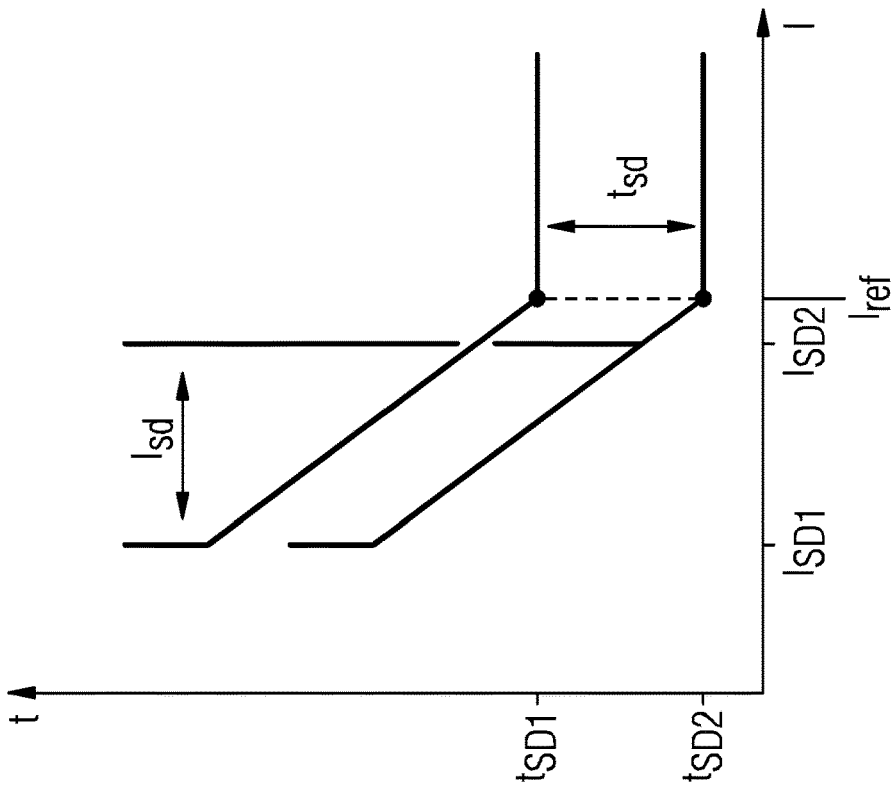
FIG. 4b shows second characteristic curve adjustment ranges.

FIG. 4b shows an illustration according to FIG. 4a with the difference that the second current limit value Iref is also adjustable according to an embodiment of the invention. In this case, the second current limit value can be adjusted between the values Iref1 and Iref2. This results in a greater adjustment range for the characteristic curve, the additional adjustment range being represented by a further region which has been filled out.

The second current limit value Iref can be adjusted directly, such as in absolute terms, for example. It can also be adjusted in relative terms, for example as a multiple of the rated current In, of the third current limit value Ir or/and of the first current limit value Isd.

The adjustment range may be 6 to 12 times the third current limit value Ir, for example.

The second current limit value Iref can be adjustable, for example, via a rotary controller, a slide controller, a keyboard input, via menu guidance, via wired or wireless transmission or the like, at the circuit breaker by an operator, for example during normal operation. The other values can be adjustable in a similar manner.

The first current limit value Isd may likewise be adjustable in absolute or/and relative terms, for example as a multiple of the rated current In or of the third current limit value Ir. For example, the first current limit value Isd may be 1.25 to 12 or 15 times the third current limit value Ir.

The fourth current limit value Ii may be permanently predefined or may be adjustable in absolute or/and relative terms, for example as a multiple of the rated current In or of the third current limit value Ir. For example, the fourth current limit value Ii may be in the range of 8 to 16 times the rated current In.

The current sensor may be in the form of a Rogowski coil, for example.

The control device may have a series circuit comprising a low-pass filter, an analog/digital converter and a microcontroller. The microcontroller may be controlled via firmware or software. The adjusted values are supplied to the control device, these values being recorded by the firmware, for example, and a corresponding interruption function or tripping function/characteristic curve being ensured by the firmware or algorithms contained in the latter.

According to an embodiment of the invention, the reference point of the current-dependent trip element or short-circuit trip element with a short time delay is intended to be adjustable.

As a result of an embodiment of the invention, the characteristic curve of the circuit breaker can be adjusted in a wider range, with the result that more closely staggered characteristic curves can be used, closer staggering of circuit breakers or fuses can be achieved, and more selectivity can be achieved.

Although the invention was described and illustrated more specifically in detail by way of the example embodiment, the invention is not restricted by the disclosed examples and other variations can be derived therefrom by a person skilled in the art without departing from the scope of protection of the invention.

The aforementioned description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Still further, any one of the above-described and other example features of the present invention may be embodied in the form of an apparatus, method, system, etc. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A circuit breaker for an electrical circuit, comprising:
a tripping unit to interrupt the electrical circuit; and
at least one current sensor to determine electrical current flowing through the circuit breaker, the tripping unit and at least one current sensor being connected to a control unit and being configured such that a determined current is comparable with current/period limit values and, upon a current/period limit value being exceeded, the tripping unit is configured to interrupt the electrical circuit, the current/period limit values including:
an adjustable first current limit value, necessary to be present for a first period to effect an interruption,
an adjustable second period, during which a second current limit value is necessary to be present to effect an interruption,
a range between the first current limit value during the first period and the second current limit value during the second period, the range relatively decreasing with relatively increasing current limit values in order to effect an interruption, wherein the second current limit value is adjustable at the circuit breaker,
wherein the circuit breaker includes a fixed rated current and wherein the second current limit value is adjustable as a multiple of the rated current,
wherein an adjustable third current limit value, relatively less than or equal to the rated current, which when exceeded, causes an interruption with a relatively long time delay, the period relatively decreasing with relatively increasing current limit values, to be affected by way of a current/period limit value characteristic curve which includes an inverse power function including a supporting point:
a first multiple of the third current limit value during a third period, and wherein a fourth current limit value is provided which, when exceeded, causes the circuit breaker to interrupt the electrical circuit without a delay.

2. The circuit breaker of claim 1, wherein the range between the first current limit value during the first period and the second current limit value during the second period includes a current/period limit value characteristic curve involving part of an inverse quadratic function.

3. The circuit breaker of claim 1, wherein the inverse power function is a fourth-power inverse power function.

4. The circuit breaker of claim 1, wherein the first multiple of the third current limit value is 6 times the third current limit value.

5. The circuit breaker of claim 1, wherein the second current limit value is adjustable as a multiple of the third current limit value.

6. The circuit breaker of claim 1, wherein the second current limit value is adjustable in a range of 6 times to 12 times the third current limit value.

7. The circuit breaker of claim 1, wherein the first current limit value is adjustable as a multiple of the rated current or of the third current limit value.

8. The circuit breaker of claim 1, wherein the second current limit value is adjustable as a multiple of the first current limit value.

9. The circuit breaker of claim 1, wherein the second period is relatively shorter than or equal to the first period.

10. The circuit breaker of claim 1, wherein the third current limit value is relatively less than the first current limit value.

11. The circuit breaker of claim 1, wherein the circuit breaker is an air circuit breaker.

12. The circuit breaker of claim 1, wherein the circuit breaker is a molded case circuit breaker.

13. The circuit breaker of claim 1, wherein an additional current limit value is provided which, when exceeded, causes the circuit breaker to interrupt the electrical circuit without a delay.

14. A circuit breaker for an electrical circuit, comprising:
a tripping unit to interrupt the electrical circuit; and
at least one current sensor to determine electrical current flowing through the circuit breaker, the tripping unit and at least one current sensor being connected to a control unit and being configured such that a determined current is comparable with current/period limit values and, upon a current/period limit value being exceeded, the tripping unit is configured to interrupt the electrical circuit, the current/period limit values including:
- an adjustable first current limit value, necessary to be present for a first period to effect an interruption,
- an adjustable second period, during which a second current limit value is necessary to be present to effect an interruption,
- a range between the first current limit value during the first period and the second current limit value during the second period, the range relatively decreasing with relatively increasing current limit values in order to effect an interruption, wherein the second current limit value is adjustable at the circuit breaker,
wherein the circuit breaker includes a fixed rated current and wherein the second current limit value is adjustable as a multiple of the rated current, and
wherein an additional current limit value is provided which, when exceeded, causes the circuit breaker to interrupt the electrical circuit without a delay.

15. The circuit breaker of claim 14, wherein an adjustable third current limit value, relatively less than or equal to the rated current, which when exceeded, causes an interruption with a long time delay, the period relatively decreasing with relatively increasing current limit values, to be affected by way of a current/period limit value characteristic curve which includes an inverse power function with the supporting point:
- a first multiple of the third current limit value during a third period.

16. The circuit breaker of claim 14, wherein the circuit breaker is an air circuit breaker.

17. The circuit breaker of claim 14, wherein the circuit breaker is a molded case circuit breaker.

18. The circuit breaker of claim 14, wherein the range between the first current limit value during the first period and the second current limit value during the second period includes a current/period limit value characteristic curve involving part of an inverse quadratic function.

19. The circuit breaker of claim 18, wherein the circuit breaker is an air circuit breaker.

20. The circuit breaker of claim 18, wherein the circuit breaker is a molded case circuit breaker.

21. The circuit breaker of claim 15, wherein the inverse power function is a fourth-power inverse power function.

22. The circuit breaker of claim 21, wherein the first multiple of the third current limit value is 6 times the third current limit value.

23. The circuit breaker of claim 21, wherein the second current limit value is adjustable as a multiple of the third current limit value.

24. The circuit breaker of claim 21, wherein the second current limit value is adjustable in a range of 6 times to 12 times the third current limit value.

25. The circuit breaker of claim 14, wherein an additional current limit value is provided which, when exceeded, causes the circuit breaker to interrupt the electrical circuit without a delay.

26. The circuit breaker of claim 14, wherein the first current limit value is adjustable as a multiple of the rated current or of the third current limit value.

27. The circuit breaker of claim 14, wherein the second current limit value is adjustable as a multiple of the first current limit value.

28. The circuit breaker of claim 14, wherein the second period is relatively shorter than or equal to the first period.

29. The circuit breaker of claim 14, wherein the third current limit value is relatively less than the first current limit value.

* * * * *